(12) United States Patent
Krueger

(10) Patent No.: US 12,270,711 B2
(45) Date of Patent: Apr. 8, 2025

(54) TEMPERATURE PROBE HOLDER

(71) Applicant: Brian Krueger, San Antonio, TX (US)

(72) Inventor: Brian Krueger, San Antonio, TX (US)

( * ) Notice: Subject to any disclaimer, the term of this patent is extended or adjusted under 35 U.S.C. 154(b) by 867 days.

(21) Appl. No.: 17/366,380

(22) Filed: Jul. 2, 2021

(65) Prior Publication Data

US 2022/0003611 A1 Jan. 6, 2022

Related U.S. Application Data

(60) Provisional application No. 63/047,479, filed on Jul. 2, 2020.

(51) Int. Cl.
*G01K 1/14* (2021.01)
*A47J 36/32* (2006.01)
*A47J 37/07* (2006.01)
*F16B 1/00* (2006.01)

(52) U.S. Cl.
CPC ............... *G01K 1/14* (2013.01); *A47J 36/32* (2013.01); *A47J 37/0786* (2013.01); *F16B 1/00* (2013.01); *A47J 2202/00* (2013.01); *F16B 2200/83* (2023.08)

(58) Field of Classification Search
None
See application file for complete search history.

(56) References Cited

U.S. PATENT DOCUMENTS

| | | | |
|---|---|---|---|
| 3,394,593 A | 7/1968 | Foster et al. | |
| 6,501,384 B2 | 12/2002 | Chapman et al. | |
| 8,453,984 B2 | 6/2013 | Best et al. | |
| 10,604,935 B1* | 3/2020 | Forgue | F16B 2/10 |
| 2003/0112846 A1 | 6/2003 | Murtagh | |
| 2008/0107146 A1 | 5/2008 | Hadj-Chikh | |
| 2011/0282540 A1* | 11/2011 | Armitage | H04Q 9/00 |
| | | | 701/31.4 |

FOREIGN PATENT DOCUMENTS

WO WO-2014158437 A1 * 10/2014 ............... F16L 3/13

* cited by examiner

*Primary Examiner* — Erica S Lin
(74) *Attorney, Agent, or Firm* — Boudwin Intellectual Property Law, LLC; Daniel Boudwin

(57) ABSTRACT

A temperature probe holder is provided. The device includes a magnetic fastener and a probe clip, whereby a connector secures the probe clip to the magnetic fastener. The magnetic fastener includes a notch and a slot. The probe clip includes a pair of resilient arms that extend upwardly and outwardly at opposite angles from a central base. Each resilient arm includes coaxially aligned apertures, such that a temperature probe can be inserted through a pair of coaxially aligned apertures. The temperature probe is secured to the probe clip due to an outward angle of the pair of resilient arms at rest. In operation, the magnetic fastener engages any ferromagnetic section of a cooking device. The device allows users to easily secure a temperature probe to various surfaces inside a cooking device. In some embodiments, the magnetic fastener is secured to an elongated ceramic bar.

18 Claims, 6 Drawing Sheets

TEMPERATURE PROBE HOLDER

CROSS REFERENCE TO RELATED APPLICATIONS

This application claims the benefit of U.S. Provisional Application No. 63/047,479 filed on Jul. 2, 2020. The above identified patent application is herein incorporated by reference in its entirety to provide continuity of disclosure.

BACKGROUND OF THE INVENTION

The present invention relates to a temperature probe holder. More specifically, the present invention provides a magnetic temperature probe holder that includes a probe clip that secures the temperature probe and a magnetic fastener that permits the temperature probe holder to be placed in multiple locations within a cooking device.

One of the more common forms of cooking is barbequing. There are numerous methods to prepare barbeque. Specifically, users may place the food on a grill, in a barbeque pit, or in a smoker, in order to properly prepare the food for consumption. Some of these cooking devices have an integrated temperature probe that displays an ambient temperature of the inner chamber of the cooking device. Ambient temperature probes are needed to ensure the food is being cooked at a desired minimum temperature. However, the integrated temperature probe disposed on these types of cooking devices are located too far away from the food to provide an accurate measurement, which often leaves the user misguided when they are attempting to determine the ambient temperature of the cooking device. When cooking certain types of food in the varying cooking devices, knowing the internal temperature of the food is critical to produce the food at the preferred consumption. If a user is aware of the ambient temperature that is surrounding the food, they will better be able to prepare the food properly. In order to have the food properly prepared, users will often utilize auxiliary temperature probes to sufficiently measure the ambient temperature of the cooking device.

The ambient temperature can fluctuate from time to time within a cooking device. In some cooking devices, the food is prepared by burning pieces of wood. However, the ambient temperature that comes from wood burning often fluctuates. The fluctuation can affect the food being cooked within the cooking device. Such fluctuation in the ambient temperature may lead to the food being prepared incorrectly. With the integrated temperature probes being inaccurate, users must use auxiliary temperature probes to measure the ambient temperature. With the fluctuation of the ambient temperature in certain cooking devices, users will require a temperature probes to constantly measure the ambient temperature. However, due to the cooking devices having an enclosed interior volume that may have extremely high temperatures, users are unable to hold the temperature probe by hand for prolonged periods. Moreover, if the user constantly opens the interior volume of the cooking device to measure the ambient temperature, they may also affect the preparation time of the food. Temperature probes may be attached to traditional clips that allow the temperature probe to remain within the interior volume of the cooking device.

Traditional temperature probe clips attach to the cooking area of the cooking device. Specifically, the traditional temperature probe clips may affix to the rack surface or grate that the food is place upon. These traditional temperature probe clips often take up valuable space on the cooking surface. For individuals, that prepare a lot of food at one time on their cooking device, they do not have the space to place a traditional temperature probe clip onto the cooking surface. Additionally, the design of the grates in some of the cooking devices have a crisscross pattern. Unfortunately, traditional temperature probe holders cannot be properly secured to the crisscross pattern grates. This leaves the users unable to properly secure their temperature probes within the cooking device.

Moreover, the standard temperature probes consist of wires that connects a measuring device to a display device. The measuring device of a temperature probe is what is placed within a cooking device to measure the ambient temperature, therein. The meaning device will be connected to a display device, via a wire, in order to show the user the ambient temperature within the cooling device. However, the wires are often cumbersome for the user and can make contact with the food placed within the cooking device. The user will attempt to manipulate the wires to move them out of the way of the food, but the user has no means to keep the wires from moving and ultimately contacting the food or getting in the user's way of preparing the food.

Therefore, there is a defined need amongst the known prior art references for a magnetic temperature probe holder with a pair of resilient arms that secures a temperature probe in place and a magnetic fastener that permits the temperature probe holder to be placed in multiple locations within a cooking device.

SUMMARY OF THE INVENTION

In view of the foregoing disadvantages inherent in the known types of temperature probe holders now present in the known art, the present invention provides a new magnetic temperature probe holder with a magnetic fastener connected to a probe clip that is placed within the internal section of a cooking device.

It is therefore an object of the present invention to provide a probe clip. The probe clip includes a pair of opposing resilient arms. The pair of opposing resilient arms are extending in opposite directions from each other. The distal end of each resilient arm comprises a tab. Users may compress the pair of opposing resilient arms together by pinching the two tabs towards one another. While the pair of resilient arms are compressed, a temperature probe may then be inserted through a pair of coaxially aligned apertures dispose on the pair of resilient arms. The probe clip will be able to hold the temperature probe in place when the user releases the tabs. By releasing the tabs, the pair of opposing resilient arms will revert to their resting position. In that resting position, the temperature probe will be secured to the probe clip and will be unable to move on its own. This method of securing a temperature probe will prohibit it from experiencing any undesirable movement and allow the temperature probe to continuously measure the ambient temperature in the location that the user desires.

Another aspect of the present invention is the magnetic fastener. The magnetic fastener permits a user to affix the temperature probe holder to the internal surface of a cooking device. For the cooking devices that have an internal surface or a grate that contains ferromagnetic material, the magnetic fastener permits the temperature probe holder to be placed thereon. While the temperature probe holder is affixed to the interior walls or the grate of the cooking device, a temperature probe can be secured to the temperature probe holder via the probe clip or a notch and a slot disposed on the magnet fastener. The ability to place the temperature probe holder anywhere in the interior of the cooking device that contains ferromagnetic material will allow the temperature probe to measure the ambient temperature of any location within the cooking device to assure that the food is being prepared properly. Moreover, allowing the temperature probe holder to be placed in varying locations within interior walls of the cooking device will assure the user that they will achieve the desired ambient temperature within the cooking device while not taking up cooking space on the grate surface or being limited by the design pattern of the grate.

Yet another aspect of the present invention is the elongated ceramic bar. There are cooking devices that lack the necessary ferromagnetic material to place the magnetic fastener thereon. In order to read the ambient temperature in those cooking devices, the magnetic fastener can connect to an elongated ceramic bar. The elongated ceramic bar allows the temperature probe holder to be placed on the grate of a cooking device without ferromagnetic material. Additionally, the elongated ceramic bar may then be place anywhere on the grate of the cooking device with a limited chance that the temperature probe holder falls through the grate due to the design pattern of the grate.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
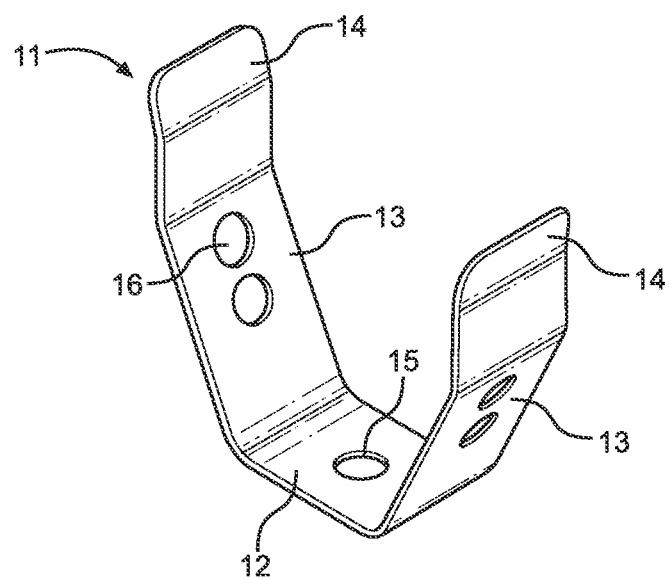
FIG. 1A shows a perspective view of an embodiment of the probe clip.

Reference is made herein to the attached drawings. Like reference numerals are used throughout the drawings to depict like or similar elements of the temperature probe holder. The figures are intended for representative purposes only and should not be limiting in any respect.

FIG. 1A shows a perspective view of an embodiment of a probe clip. The probe clip 11 comprises a central base 12 and a pair of resilient arms 13. The pair of resilient arms 13 are disposed on opposing ends of the central base 12. The pair of resilient arms 13 extend upwardly and outwardly at opposite angles from the central base 12. The pair of resilient arms 13 are biased towards an outward angle relative to the central base 12. A distal end of each resilient arm 13 includes a tab 14. Users may alter the position and the outward angle of the pair of opposing arms 13 by pinching the tabs 14 towards each other.

An opening 15 is disposed through the central base 12 of the probe clip 11. The opening 15 is centrally located on the central base 12. A plurality of coaxially aligned apertures 16 are disposed through each resilient arm 13. The plurality of coaxially aligned apertures 16 on a first resilient arm will mirror the plurality of coaxially aligned apertures 16 on a second resilient arm.

Figure 1B:
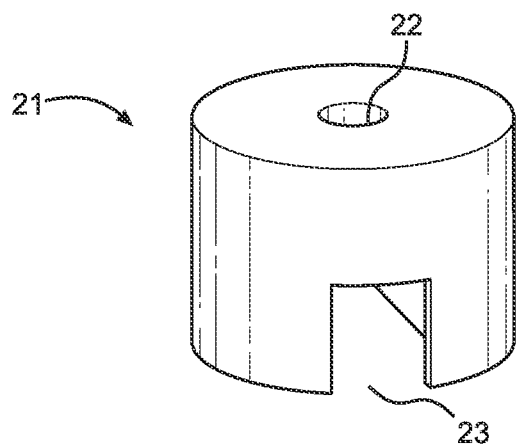
FIG. 1B shows a perspective view of an embodiment of the magnetic fastener.
Figure 1C:
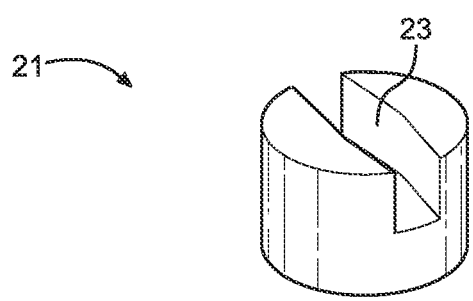
FIG. 1C shows a perspective view of an embodiment of the magnetic fastener.

FIGS. 1B and 1C show perspective views of an embodiment of a magnetic fastener. The magnetic fastener 21 comprises an upper end and a lower end, defining a cylindrical body. The lower end of the magnetic fastener 21 includes a notch 23. The notch 23 extends through the diameter of the lower end. The upper end of the magnetic fastener 21 includes a slot 22. The slot 22 extends through the upper end of the magnetic fastener 21 and exists into the notch 23. The magnetic fastener 21 may attach to any ferromagnetic material surface.

Figure 1D:
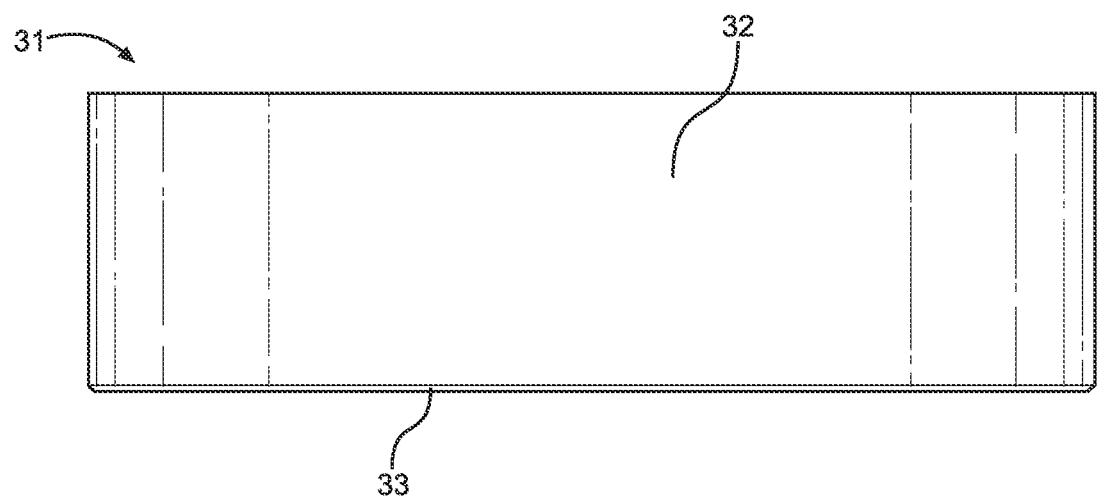
FIG. 1D shows a top view of an embodiment of the elongated ceramic bar.

FIG. 1D shows a top view of an embodiment of an elongated ceramic bar. The elongated ceramic bar 31 is composed of a ferromagnetic material. The elongated ceramic bar 31 comprises a top face 32, a bottom face, and plurality of sides 33. The plurality of sides 33 are sandwiched between the top face 32 and the bottom face. In the shown embodiment, the elongated ceramic bar 31 is rectangular in shape.

Figure 2A:
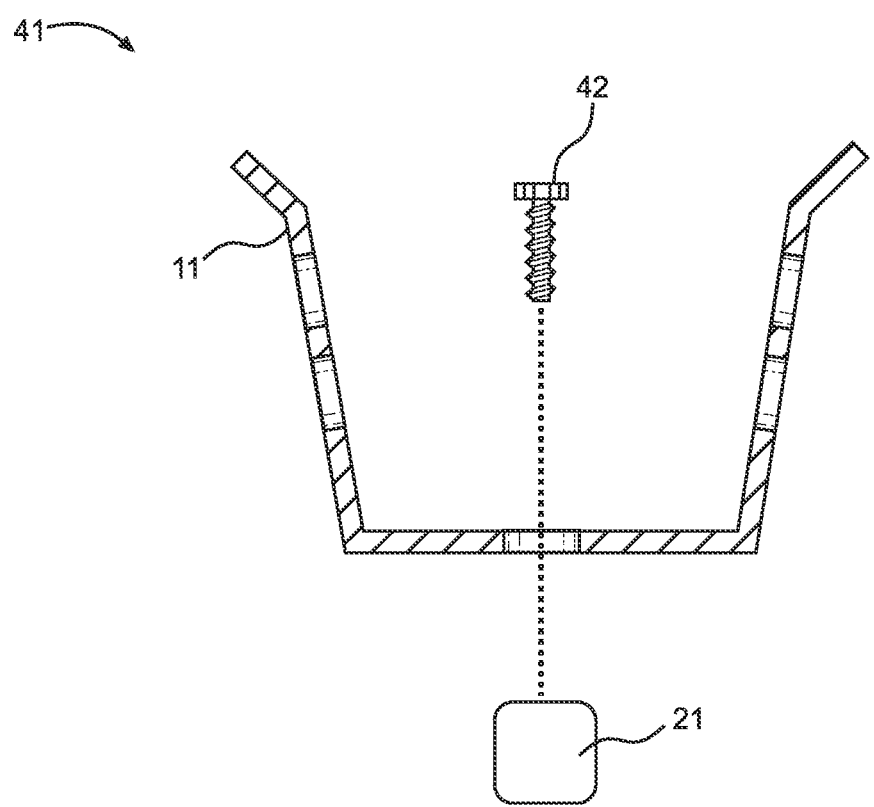
FIG. 2A shows an exploded, cross-sectional view of an embodiment of the temperature probe holder.
Figure 2B:
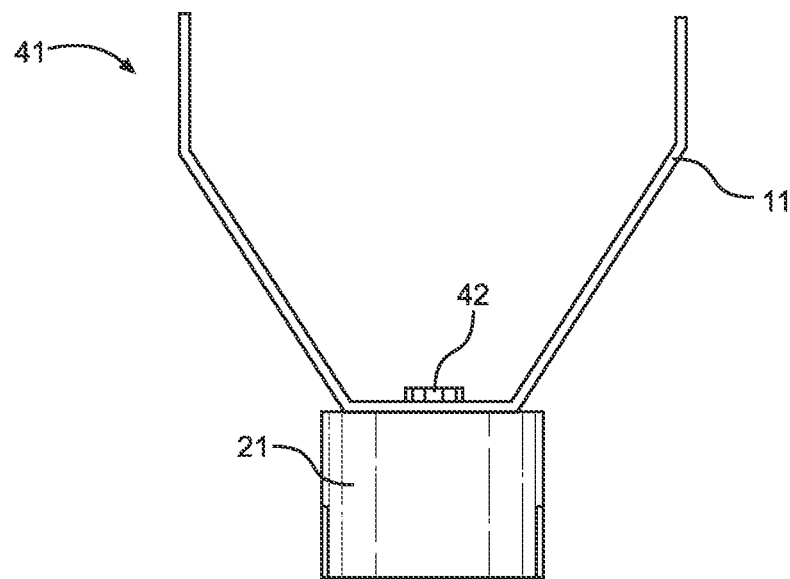
FIG. 2B shows an assembled view of an embodiment of the temperature probe holder.

FIGS. 2A and 2B show an exploded, cross-sectional view and an assembled view of an embodiment of a temperature probe holder, respectively. The temperature probe holder 41 includes a probe clip 11, a magnetic fastener 21, and a connector 42. The connector 42 comprises a head and a threaded body. In assembly, the threaded body of the connector 42 is inserted through the opening disposed on the central base of the probe clip 11 and the slot on the upper end of the magnetic fastener 21. In one embodiment, the slot includes a threaded interface. The threaded interface of the slot can engage the threaded body of the connector 42. When the threaded interface and the threaded body are engaged, the connector 42 is secured to the magnetic fastener 21. The connector 42 secures the probe clip 11 to the magnetic fastener 21. In one embodiment, the connector 42 is a bolt. In one embodiment, the connector 42 is a screw. In one embodiment, the connector 42 is a stud.

Figure 3A:
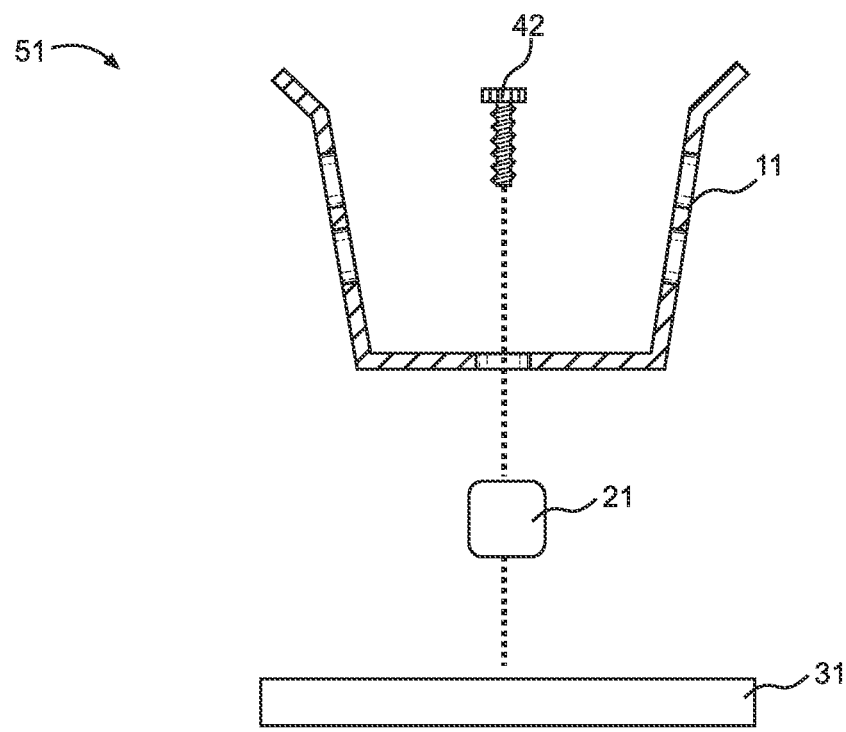
FIG. 3A shows an exploded, cross-sectional view of an alternative embodiment of the temperature probe holder.
Figure 3B:
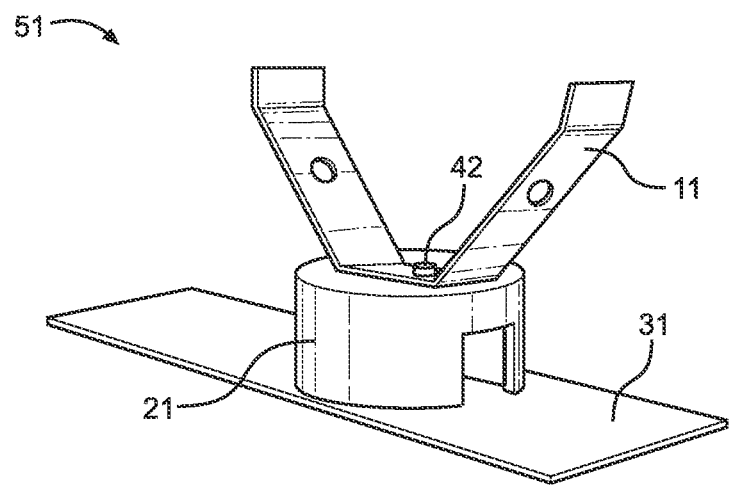
FIG. 3B shows an assembled view of an alternative embodiment of the temperature probe holder.

FIGS. 3A and 3B show an exploded, cross-sectional view and an assembled view of an alternative embodiment of a temperature probe holder. The temperature probe holder 51 includes a probe clip 11, a magnetic fastener 21, a connector 42, and an elongated ceramic bar 31. The connector 42 comprises a head and a threaded body. In assembly, the threaded body of the connector 42 is inserted through the opening disposed on the central base of the probe clip 11 and the slot on the upper end of the magnetic fastener 21. The connector 42 secures the probe clip 11 to the magnetic fastener 21. The lower end of the magnetic fastener 21 is connected to the top face of the elongated ceramic bar 31. The magnetic properties of the magnetic fastener 21 will secure the elongated ceramic bar 31 to the temperature probe holder 51.

Figure 4:
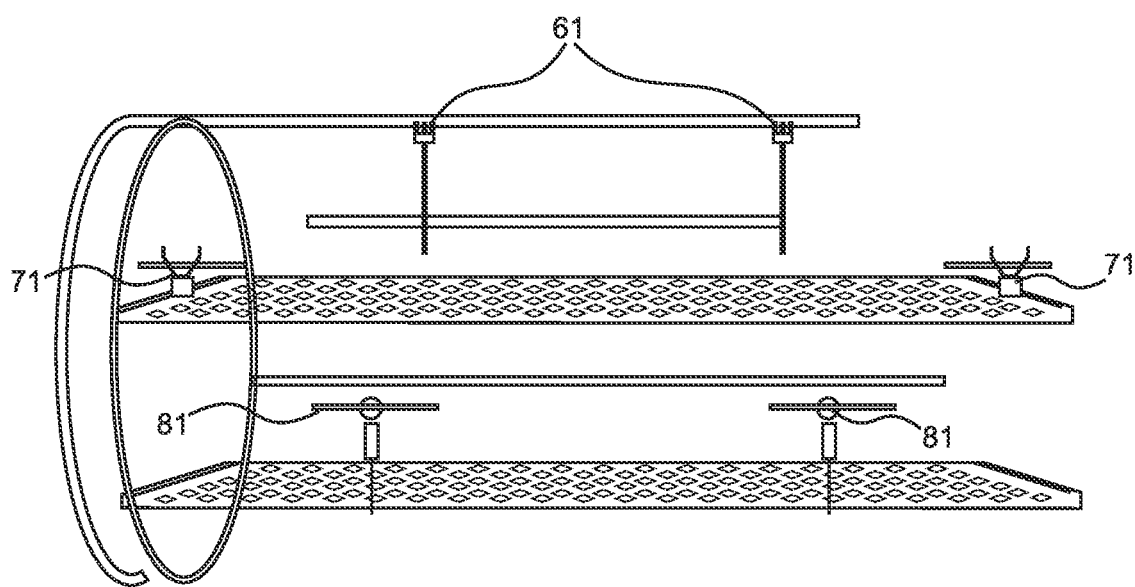
FIG. 4 shows a perspective view of multiple configurations of the temperature probe holder in use
Figure 5A:
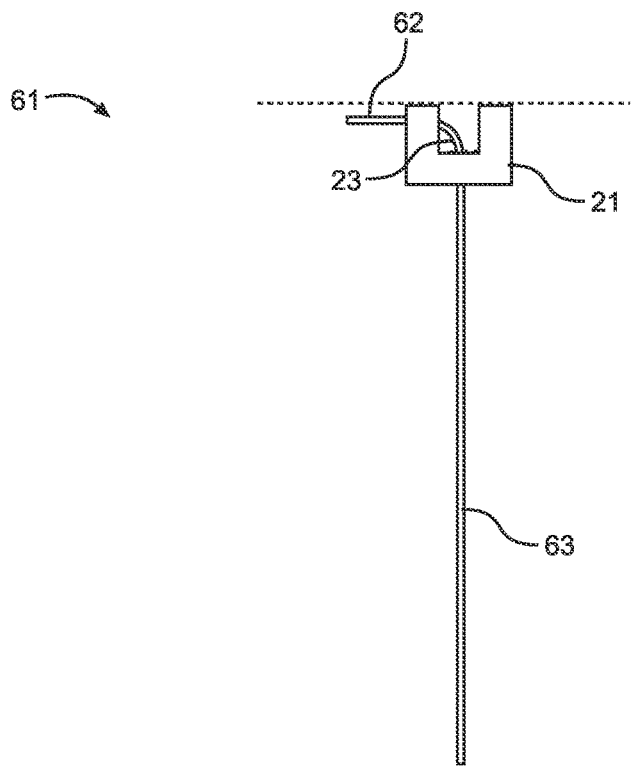
FIG. 5A shows a perspective view of an embodiment of the temperature probe holder in use.

FIG. 4 shows a perspective view of multiple configurations of a temperature probe holder in use. Depending on the type of cooking device that the user is operating, the temperature probe holder may be utilized in multiple different configurations. A first configuration 61 does not have the magnetic fastener coupled with the probe clip. Instead, the magnetic fastener is in direct contact with the upper section of the ferromagnetic interior of the cooking device and the temperature probe is threaded into the notch out of the slot of the magnetic fastener. A second configuration 71 has the temperature probe that includes the magnetic fastener coupled with the probe clip, via the connector. In this configuration 71, the magnetic fastener in direct contact with the ferromagnetic grate of the cooking device. The temperature probe is threaded through the coaxially aligned apertures disposed on the pair of resilient arms of the probe clip. The probe clip will hold the temperature probe in place and measure the ambient temperature of the area around the grate. A third configuration 81 has the temperature probe that includes the magnetic fastener coupled with the probe clip, via the connector. In this configuration 81, the magnetic fastener is in direct contact with the ferromagnetic interior wall of the cooking device, such that the temperature probe holder extends parallel to the grate. The temperature probe is threaded through the coaxially aligned apertures disposed on the pair of resilient arms of the probe clip. The probe clip will hold the temperature probe in place and measure the ambient temperature of the area around the interior wall. The multiple different configurations allow the temperature probe holder to be placed in multiple ways within the cooking FIG. 5A shows a perspective view of an embodiment of a temperature probe holder in use. In the shown configuration 61 of the temperature probe holder, the lower end of the magnetic fastener 21 is directly connected to the ferromagnetic materials without the probe clip or the connector. A temperature probe 63 is on the end of a temperature probe wire 62. The temperature probe 63 is inserted through the notch 23 and out of the slot disposed on the upper end of the magnetic fastener 21. Thus, the temperature probe 63 will hang from the magnetic fastener 21 into an area that the user wants the ambient temperature to be measure. In use, this configuration 62 of the temperature probe holder is secured to an interior lid of a cooking device, such that the temperature probe 63 is suspended in close proximity to the items placed upon the grate or other surfaces within the cooking device.

Figure 5B:
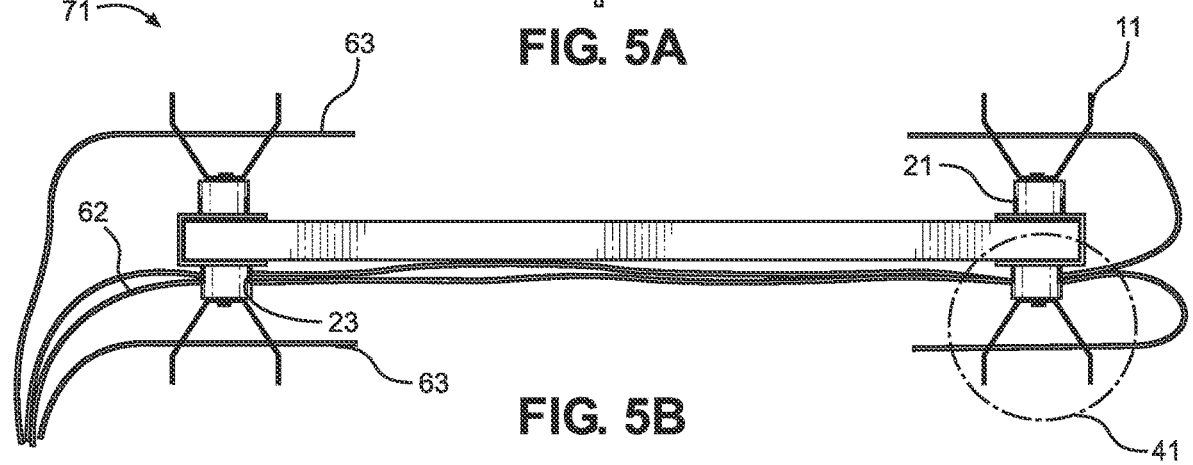
FIG. 5B shows a perspective view of an embodiment of the temperature probe holder in use.

FIG. 5B shows a perspective view of an embodiment of a temperature probe holder in use. In the shown configuration 71 of the temperature probe holder 41, the temperature probe holder 41 is attached to a cooking device grate. The cooking device grate is made of a ferromagnetic material that allows the magnetic fastener 21 to remain secured thereon. The magnetic fastener 21 is coupled with the probe clip 11, via the connector. In use, users can pinch the tabs on the distal end of the pair of resilient arms and thread the temperature probe 63 through an aperture on a first resilient arm and through the corresponding aperture on a second resilient arm. When the temperature probe 63 is inserted through the coaxially aligned apertures on the pair of resilient arms, the user can release the tabs on the distal end of the pair of resilient arms and the probe clip 11 will return to the resting outward angle. At the outward angle, the probe clip 11 will secure the temperature probe 63 in position to measure the ambient temperature. Moreover, if a user has multiple temperature probe holders 41 disposed along different locations of the cooking device grate, the temperature probe 63 and the corresponding temperature probe wire 62 may pass through the notch 23 of another temperature probe holder 41 and through the notch 23 of the desired temperature probe holder 41 to reach the probe clip 11 of the desired temperature probe holder 41. Threading the temperature probe wire 62 through the notch 23 of a temperature probe holder 41 will prevent the temperature probe wire 62 from contacting any food that is placed within the cooking device and prevent the temperature probe wire 62 from getting in the user's way as they prepare the food. The notch 23 serves to prevent the temperature probe wire 62 from dangling into the heat source within the cooking device.

Figure 5C:
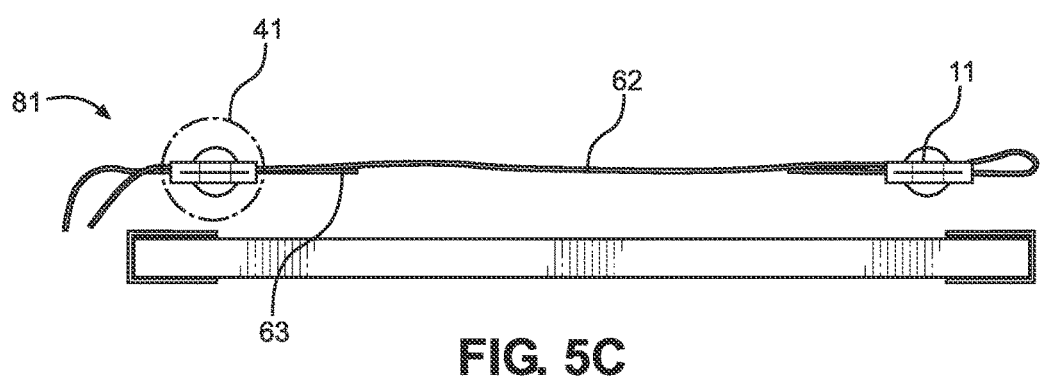
FIG. 5C shows a perspective view of an embodiment of the temperature probe holder in use.

FIG. 5C shows a perspective view of an embodiment of a temperature probe holder in use. In the shown configuration 81 of the temperature probe holder 41, the temperature probe holder 41 is attached to an interior wall of a cooking device, such that the temperature probe holder 41 extends parallel to the grate. The interior wall of the cooking device is made of a ferromagnetic material that allows the magnetic fastener to remain secured thereon. The magnetic fastener is coupled with the probe clip, via the connector. In use, users can pinch the tabs on the distal end of the pair of resilient arms and thread the temperature probe 63 through an aperture on a first resilient arm and through the corresponding aperture on a second resilient arm. When the temperature probe 63 is inserted through the coaxially aligned apertures on the pair of resilient arms, the user can release the tabs on the distal end of the pair of resilient arms and the probe clip will return to the resting outward angle. At the outward angle, the probe clip will secure the temperature probe 63 in position to measure the ambient temperature. Moreover, if a user has multiple temperature probe holders 41 in disposed along different locations of the interior wall of a cooking device, the temperature probe 63 and the corresponding temperature probe wire 62 may pass through the notch of another temperature probe holder 41 and through the notch of the desired temperature probe holder 41 to reach the probe clip of the desired temperature probe holder 41. Threading the temperature probe wire 62 through the notch of a temperature probe holder 41 will prevent the temperature probe wire 62 from contacting any food that is placed within the cooking device and prevent the temperature probe wire 62 from getting in the user's way as they prepare the food. The notch 23 serves to prevent the temperature probe wire 62 from dangling into the heat source within the cooking device.

Figure 6:
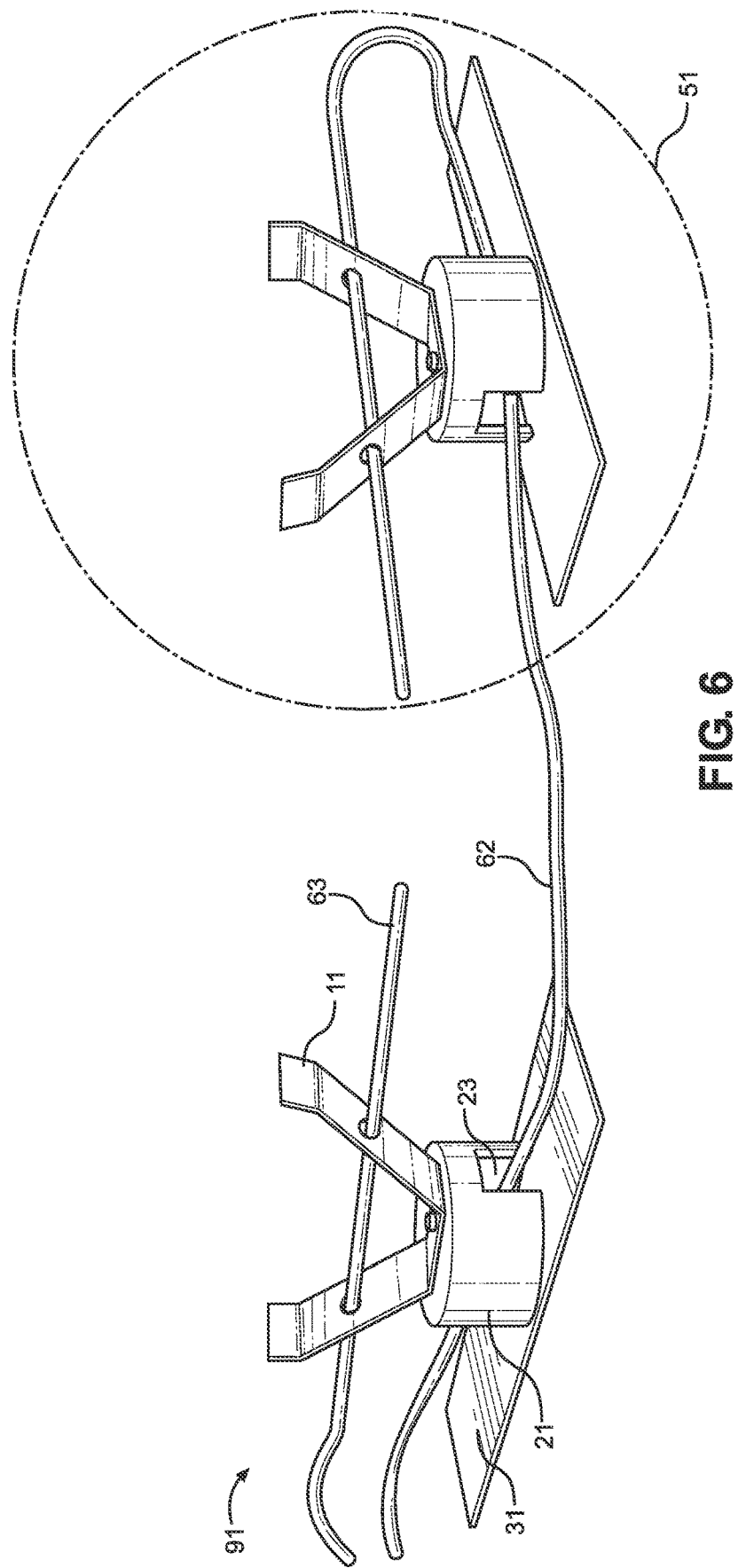
FIG. 6 shows a perspective view of an alternative embodiment of the temperature probe holder in use.

FIG. 6 shows a perspective view of an alternative embodiment of a temperature probe holder in use. In the shown configuration 91 a temperature probe holder 51 is intended for a cooking device without any internal ferromagnetic material. In such a cooking device, the temperature probe holder 51 will require an elongated ceramic bar 31. The elongated ceramic bar 31 is made of a ferromagnetic material that allows the magnetic fastener 21 to remain secured thereon. The temperature probe holder 51 may be placed upon an interior surface of a cooking device grate. The magnetic fastener 21 is coupled with the probe clip 11, via the connector. In use, users can pinch the tabs on the distal end of the pair of resilient arms and thread the temperature probe 63 through an aperture on a first resilient arm and through the corresponding aperture on a second resilient arm. When the temperature probe 63 is inserted through the coaxially aligned apertures on the pair of resilient arms, the user can release the tabs on the distal end of the pair of resilient arms and the probe clip 11 will return to the resting outward angle. At the outward angle, the probe clip 11 will secure the temperature probe 63 in position to measure the ambient temperature. Moreover, if a user has multiple temperature probe holders 51 disposed along different locations of the cooking device grate, the temperature probe 63 and the corresponding temperature probe wire 62 may pass through the notch 23 of another temperature probe holder 51 and through the notch 23 of the desired temperature probe holder 51 to reach the probe clip 11 of the desired temperature probe holder 51. Threading the temperature probe wire 62 through the notch of a temperature probe holder 41 will prevent the temperature probe wire 62 from contacting any food that is placed within the cooking device and prevent the temperature probe wire 62 from getting in the user's way as they prepare the food.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A temperature probe holder, comprising:
a magnetic fastener having a lower end and an upper end;
wherein the magnetic fastener includes a notch that is extending through the lower end;
a slot disposed on the upper end of the magnetic fastener;
wherein the slot extends through the magnetic fastener;
a probe clip having a pair of resilient arms and a central base;
wherein the pair of resilient arms extend upwardly and outwardly at opposite angles from the central base;
an opening disposed through the central base;
a connector passing through the opening and the slot to secure the pair of resilient arms to the upper end of the magnetic fastener;
a plurality of apertures disposed on the pair of resilient arms;
wherein a first plurality of apertures disposed on a first resilient arm corresponds with a second plurality of apertures disposed on a second resilient arm; and
further comprising a temperature probe is inserted through the first apertures and the second apertures disposed on the pair of resilient arms of the probe clip.

2. The temperature probe holder of claim 1, wherein the pair of resilient arms of the probe clip are biased towards an outward angle.

3. The temperature probe holder of claim 1, wherein the probe clip is made of a flexible material.

4. The temperature probe holder of claim 1, wherein a distal end of each of the resilient arms include a tab.

5. The temperature probe holder of claim 4, wherein the first resilient arm and the second resilient arm are compressed together by pushing the tabs towards each other.

6. The temperature probe holder of claim 1, wherein the first apertures disposed on the first resilient arm and the second apertures disposed on the second resilient arm are coaxially aligned when the pair of arms are compressed.

7. The temperature probe holder of claim 6, wherein compressing the first resilient arm towards the second resilient arm enables the temperature probe to be inserted through coaxially aligned apertures disposed on each of the resilient arms.

8. The temperature probe holder of claim 7, wherein the outward angle of the probe clip permits the pair of resilient arms to lock the temperature probe in position when the first resilient arm and the second resilient arm are released from compression.

9. The temperature probe holder of claim 1, wherein the magnetic fastener is removably secured to a ferromagnetic interior surface via magnetic engagement.

10. A temperature probe holder, comprising:
a magnetic fastener having a lower end and an upper end;
wherein the magnetic fastener includes a notch that is extending through the lower end;
a slot disposed on the upper end of the magnetic fastener;
wherein the slot extends through the magnetic fastener;
a probe clip having a pair of resilient arms and a central base;
wherein the pair of resilient arms extend upwardly and outwardly at opposite angles from the central base;
an opening disposed through the central base;
a connector passing through the opening and the slot to secure the pair of resilient arms to the upper end of the magnetic fastener;
a plurality of apertures disposed on the pair of resilient arms;
wherein a first plurality of apertures disposed on a first resilient arm corresponds with a second plurality of apertures disposed on a second resilient arm; and
an elongated ceramic bar made of a ferromagnetic material;
wherein the lower end of magnetic fastener is engaged with the elongated ceramic bar; and
further comprising a temperature probe is inserted through the first apertures and the second apertures disposed on the pair of resilient arms of the probe clip.

11. The temperature probe holder of claim 10, wherein the pair of resilient arms of the probe clip are biased towards an outward angle.

12. The temperature probe holder of claim 10, wherein the probe clip is made of a flexible material.

13. The temperature probe holder of claim 10, wherein a distal end of each of the resilient arms includes a tab.

14. The temperature probe holder of claim 13, wherein the first resilient arm and the second resilient arm are compressed together by pushing the tabs towards each other.

15. The temperature probe holder of claim 10, wherein the first apertures on the first resilient arm and the second apertures on the second resilient arm are coaxially aligned when the pair of arms are compressed.

16. The temperature probe holder of claim 15, wherein compressing the first resilient arm towards the second resilient arm enables the temperature probe to be inserted through a corresponding aperture on each of the resilient arms.

17. The temperature probe holder of claim 16, wherein the outward angle of the probe clip permits the pair of resilient arms to lock the temperature probe in position when the first resilient arm and the second resilient arm are released from compression.

18. The temperature probe holder of claim 10, wherein the elongated ceramic bar is placed upon a surface to support the temperature probe.

\* \* \* \* \*